US011264918B2

(12) United States Patent
Larson et al.

(10) Patent No.: US 11,264,918 B2
(45) Date of Patent: Mar. 1, 2022

(54) ISOLATED INVERTERS

(71) Applicant: Kohler Co., Kohler, WI (US)

(72) Inventors: Adam Larson, Mequon, WI (US);
Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 101 days.

(21) Appl. No.: 16/208,855

(22) Filed: Dec. 4, 2018

(65) Prior Publication Data
US 2019/0190401 A1 Jun. 20, 2019

Related U.S. Application Data

(60) Provisional application No. 62/598,794, filed on Dec. 14, 2017.

(51) Int. Cl.
| H02M 7/5395 | (2006.01) |
| H02M 1/00   | (2006.01) |
| H02M 7/5387 | (2007.01) |
| H02M 7/48   | (2007.01) |
| H02M 1/38   | (2007.01) |
| H02M 5/458  | (2006.01) |

(Continued)

(52) U.S. Cl.
CPC ........... *H02M 7/5387* (2013.01); *H02M 1/38* (2013.01); *H02M 5/4585* (2013.01); *H02M 7/48* (2013.01); *H02M 7/5395* (2013.01); *H02M 1/008* (2021.05); *H02M 1/0038* (2021.05); *H02M 1/0067* (2021.05); *H02M 1/385* (2021.05); *H02P 9/305* (2013.01); *H02P 27/06* (2013.01)

(58) Field of Classification Search
CPC ........... H02M 1/38; H02M 5/40–4585; H02M 7/5387–53875
See application file for complete search history.

(56) References Cited

U.S. PATENT DOCUMENTS 3,430,123 A 2/1969 Corry et al.
5,045,988 A 9/1991 Gritter et al.
(Continued)

FOREIGN PATENT DOCUMENTS

CN 101176049 A 5/2008
CN 203312805 U 11/2013
(Continued)

OTHER PUBLICATIONS

English machine translation of JP2010206904A available Sep. 16, 2010. (Year: 2010).*

(Continued)

*Primary Examiner* — Hal Kaplan
*Assistant Examiner* — David A Shiao
(74) *Attorney, Agent, or Firm* — Lempia Summerfield Katz LLC

(57) ABSTRACT

An isolated bus inverter system including inverter circuits and a controller. The inverter circuits include a switching array to provide a polyphase alternating current (AC) signal to an output. Each of the inverter circuits includes an energy source isolated from the other inverter circuits of the inverter circuits or a reference isolated from the other inverter circuits of the inverter circuits. The controller is configured to generate timing signals for the inverter circuits to generate the AC signals for the output based on DC signals received from one or more rectifier circuits.

11 Claims, 14 Drawing Sheets

(51) Int. Cl.
*H02P 27/06* (2006.01)
*H02P 9/30* (2006.01)

(56) References Cited

U.S. PATENT DOCUMENTS

| | | | |
|---|---|---|---|
| 5,537,308 A | 7/1996 | Gritter | |
| 6,115,276 A | 9/2000 | Mao | |
| 7,173,344 B2 | 2/2007 | Yang | |
| 7,479,091 B2 | 1/2009 | Yang | |
| 7,786,616 B2 | 8/2010 | Naden et al. | |
| 7,956,563 B2 | 6/2011 | Perisic et al. | |
| 8,330,291 B2 | 12/2012 | Kumar | |
| 9,099,938 B2 | 8/2015 | Ilic et al. | |
| 9,561,789 B2 | 2/2017 | Nishi et al. | |
| 9,729,066 B1 | 8/2017 | Lu et al. | |
| 9,812,949 B2 | 11/2017 | Hintz | |
| 9,931,951 B2 | 4/2018 | Khaligh et al. | |
| 2002/0176261 A1 | 11/2002 | Norrga | |
| 2003/0155813 A1 | 8/2003 | Walter | |
| 2004/0155526 A1 | 8/2004 | Naden | |
| 2005/0230976 A1 | 10/2005 | Yang | |
| 2007/0159858 A1 | 7/2007 | Spindler | |
| 2009/0033274 A1 | 2/2009 | Perisic et al. | |
| 2009/0212631 A1 | 8/2009 | Taylor | |
| 2010/0133816 A1* | 6/2010 | Abolhassani | H02P 25/22 290/44 |
| 2010/0231150 A1* | 9/2010 | Tan | H02M 7/53873 318/400.3 |
| 2011/0080040 A1 | 4/2011 | Kumar | |
| 2012/0106210 A1 | 5/2012 | Xu | |
| 2012/0287545 A1* | 11/2012 | Tran | H03K 17/0822 361/101 |
| 2014/0148984 A1 | 5/2014 | Nishi et al. | |
| 2014/0217827 A1 | 8/2014 | Cheek et al. | |
| 2014/0361536 A1 | 12/2014 | Neet | |
| 2015/0061639 A1* | 3/2015 | Webster | H02M 1/38 324/76.39 |
| 2015/0103574 A1 | 4/2015 | Hintz | |
| 2015/0343911 A1 | 12/2015 | White et al. | |
| 2016/0016479 A1 | 1/2016 | Khaligh et al. | |
| 2017/0047742 A1* | 2/2017 | Narla | H02M 7/00 |
| 2017/0099008 A1* | 4/2017 | Keister | H02M 7/49 |
| 2017/0117821 A1* | 4/2017 | Kato | H02M 1/12 |
| 2017/0274992 A1 | 9/2017 | Chretien | |
| 2018/0056793 A1* | 3/2018 | Rozman | H02K 19/16 |
| 2019/0207511 A1* | 7/2019 | Ordasi | H02M 1/38 |

FOREIGN PATENT DOCUMENTS

| | | | |
|---|---|---|---|
| CN | 104426409 A | | 3/2015 |
| CN | 106972758 A | * | 7/2017 |
| EP | 3186148 A1 | | 7/2017 |
| GB | 2069260 A | | 8/1981 |
| JP | 2010206904 A | * | 9/2010 |
| WO | WO2017041752 A1 | | 3/2017 |

OTHER PUBLICATIONS

Z. Chen, Y. Wong, T. Yim and W. Ki, "A 12A 50V half-bridge gate driver for enhancement-mode GaN HEMTs with digital dead-time correction," 2015 IEEE International Symposium on Circuits and Systems (ISCAS), Lisbon, 2015, pp. 1750-1753, doi: 10.1109/ISCAS.2015.7168992. (Year: 2015).*

Kolar, Johann W., and Thomas Friedli. "The essence of three-phase PFC rectifier systems—Part I." IEEE Transaction on Power Electronics 28.1 (2013): 176-198.

Von Jouanne, Annette, Shaoan Dai, and Haoran Zhang. "A multi-level inverter approach providing DC-link balancing, ride-through enhancement, and common-mode voltage elimination." IEEE Transactions on Industrial Electronics 49.4 (2002): 739-745.

"Hybrid Power Solutions for Telecom." Neopower, Apr. 2, 2018, www.neopower-ng.com/category/telecom-hybrid.

European Search Report for European Patent Application No. 18212005.5-1201 dated May 16, 2019.

Kumar, Dinesh, Firuz Zare, and Arindam Ghosh. "DC Microgrid Technology: System Architectures, AC Grid Interfaces, Grounding Schemes, Power Quality, Communication Networks, Applications, and Standardizations Aspects." IEEE Access vol. 5, 2017. (pp. 12230-12256).

Chinese Office Action cited in corresponding Chinese patent application No. 201811531892.2; dated Jul. 22, 2020; 11pp.

European Office Action cited in corresponding European patent application No. 18 212 005.5-1201; dated Jan. 13, 2021; 5pp.

European Office Action cited in corresponding European patent application No. 18 212 005.5-1201; dated Mar. 13, 2020, 6pp.

Chinese Office Action for Chinese Application No. 201811531892.2 dated May 25, 2021.

* cited by examiner

ISOLATED INVERTERS

CROSS REFERENCE TO PRIOR APPLICATION

This application claims priority benefit of Provisional Application No. 62/598,794 filed Dec. 14, 2017, which is hereby incorporated by reference in its entirety.

FIELD

This application relates to the field of inverters, and more specifically, to isolated inverter circuits including an energy source isolated from other inverter circuits.

BACKGROUND

An inverter is a device which converts direct-current electrical power into alternating current electrical power. An inverter may be uni-directional, converting direct current (DC) power from a source to alternating current (AC) power out, or bi-directional, converting DC power from a source to AC power out as well as converting AC power from a source to DC power out to a load or storage device.

BRIEF DESCRIPTION OF THE DRAWINGS

Exemplary embodiments are described herein with reference to the following drawings.

DETAILED DESCRIPTION

Figure 1:
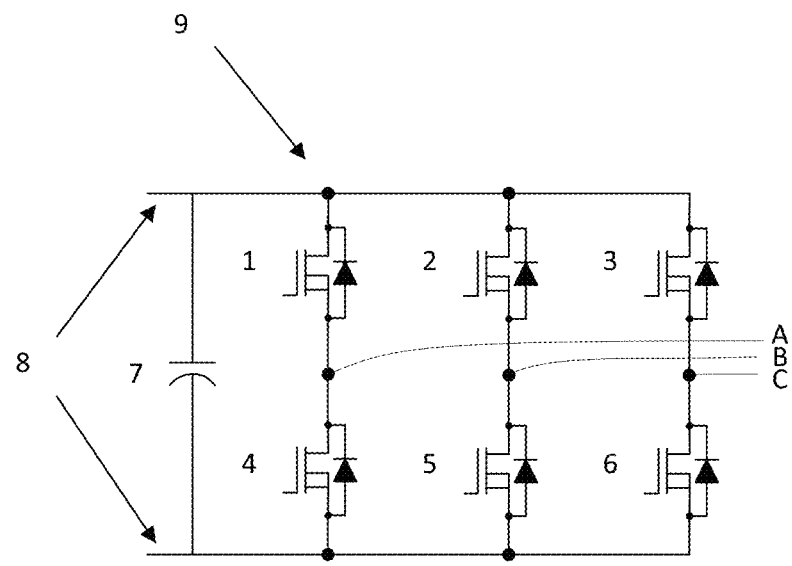
FIG. 1 illustrates an example inverter system.

FIG. 1 illustrates an inverter system 9 in which three switch pairs 1 and 4, 2 and 5, and 3 and 6 allow regulation of the line to line output voltage. The inverter system 9 may provide a three phase alternating current (AC) output derived from a direct current (DC) input.

In the configuration shown in FIG. 1, each switch pair is connected to the same DC bus 8, regulating line to line voltage. The line to line voltages are at a first, higher voltage level. For example, the voltage between phase A and phase B is approximately 480 V, the voltage between phase B and phase C is approximately 480 V, and the voltage between phase C and phase A is approximately 480 V.

There are advantages to regulating the line to line voltages over regulating line to neutral voltages. If a system regulates phase to phase using the higher voltage levels, all three outputs can be supplied from a single DC bus with a combination of 6 switches as shown in FIG. 1. The current on each of the phases can be controlled by selectively switching a positive-side switch that increases the current and a negative-side switch that decreases the current, while the current returns through on of the other switch pairs. This system works for motors and balanced loads.

However, there are also disadvantages to regulating line to line voltages as compared to regulating line to neutral voltages. Because the current sourced by a given set of switches must return through a combination of the other switches, the output voltage of each phase may change if the loading is not completely balanced, such as in applications where one of the phases has a single-phase load, such as lighting, computers, controls, and such devices. Many industrial applications may provide unbalanced load at some time.

When regulating line to line voltage, the system may have a floating neutral, a capacitively-coupled neutral, or another technique to establish a neutral point. These techniques may still allow the neutral point to be biased toward a given phase when the system load is imbalanced between the phases. Current leaving the inverter on phase A has two paths to return to the DC bus, phase B and phase C. Because of this, a change in current on a given phase may affect the current on the other two phases, meaning that it may be difficult to control current individually or to provide imbalanced current.

Figure 2:
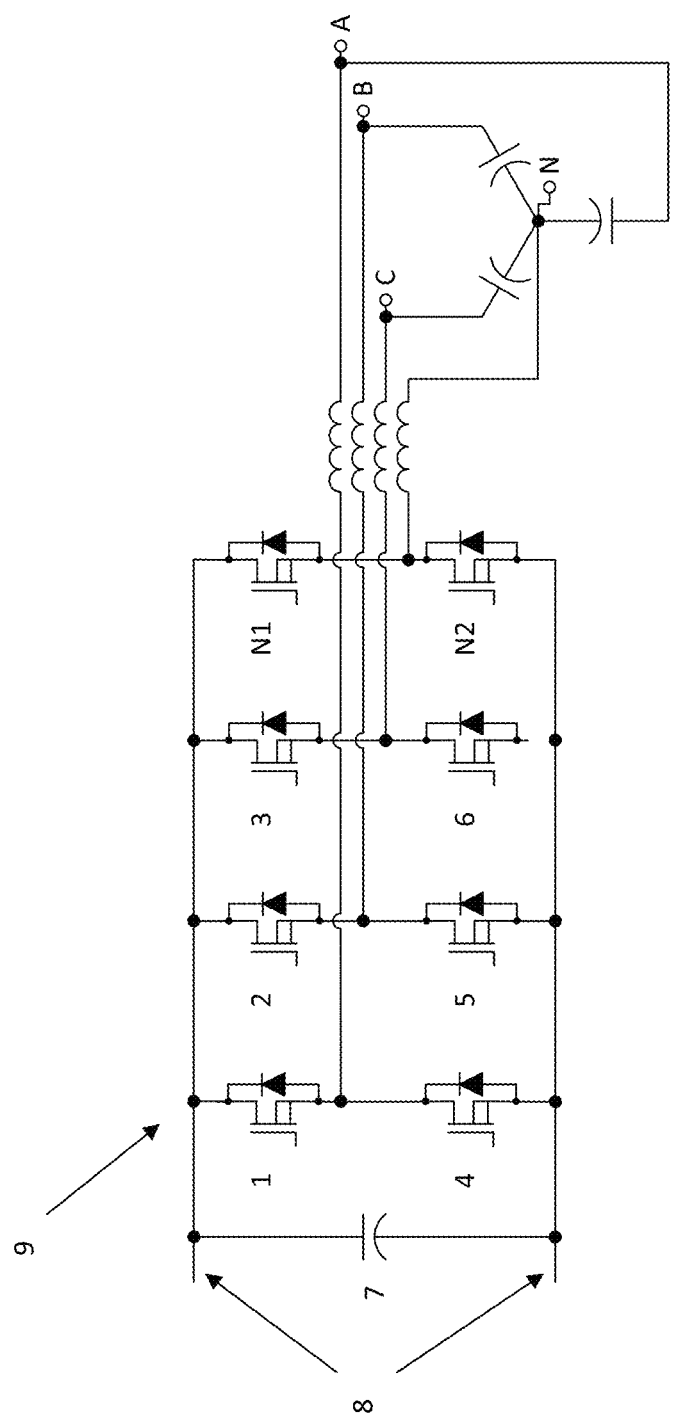
FIG. 2 illustrates the example inverter system including additional switches.

Other techniques for establishing the neutral on a line to line regulating inverter may also be used, such as a fourth set of switches to the inverter bus controlling the neutral voltage or a transformer connected to provide a stable neutral reference, but these techniques require additional complexity and reduce efficiency. Examples of a fourth set of switches are shown, for example, using N1 and N2 for the neutral supply in FIG. 2.

Line to line regulation may require a high-voltage DC bus. As an example, a 480V line to line inverter may require a 700 VDC bus in order to support to necessary AC output voltage. The AC output voltage may be a sine wave providing a crest factor of 1.41, meaning that the voltage peak is 1.41 times the RMS voltage equivalent. In addition to the crest factor, the DC bus may need to operate at a higher voltage in order to provide driving voltage to increase current at the peak output voltage. With a 700V DC bus, the inverter may need high-voltage capacitors. High voltage capacitors may be much larger, more costly and difficult to source than lower voltage capacitors.

Capacitors may be stacked in series to provide the voltage rating, but may require circuitry to equalize the voltage between them. Equalizing circuitry may be simple resistive elements which dissipate energy, decreasing the system efficiency or may be complex switching power circuits which add cost and complexity. Connecting capacitors in series may also reduce the effective capacitance of the combination, requiring additional capacitors. As an example, a 400 uF capacitor bank rated for 700V made from 450V rated capacitors may require 1600 uF of 450V capacitors to achieve the necessary rating.

Line to line regulation may require high-voltage switches. For example, an inverter providing line to line regulation at 480V may require a 700V DC bus. In order to prevent failure of the switches, the switch rating may need to exceed 700V by a considerable safety factor. For example, for a 700V DC bus, the switches may be rated to support 900V. Switches rated for 900V may have high switch cost, high on-state resistance, high forward voltage drop, large physical size, or other undesirable characteristics.

Figure 3:
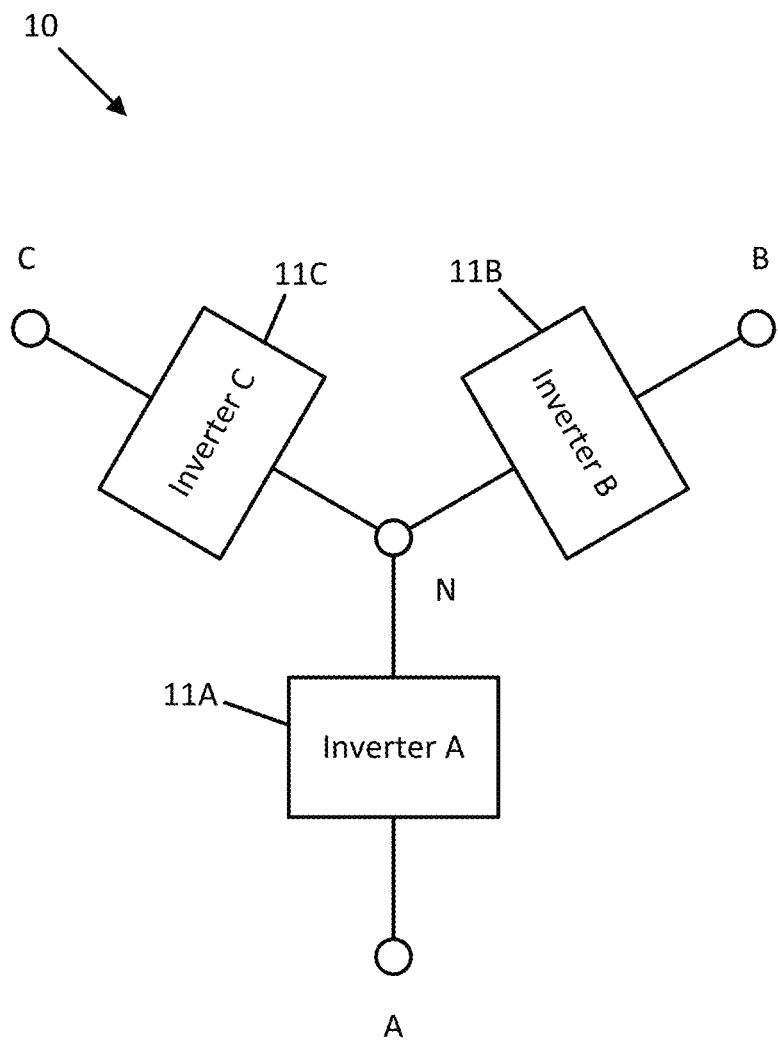
FIG. 3 illustrates an example system utilizing a line to neutral regulating three-phase inverter.

As an alternative to line to line regulation, an inverter may regulate line to neutral voltage. In this configuration, the three-phase inverter is broker into three independent switch configurations. Each switch configuration may include 4 or more switches, allowing the current to be increased and decreased in both the positive and negative direction. FIG. 3 illustrates an example system utilizing a line to neutral regulating three-phase inverter.

The line to neutral voltages or voltages between the phases are at a second, lower voltage level. In one example, phase A to neutral is approximately 277 V, phase B to neutral is approximately 277 V, and phase C to neutral is approximately 277 V.

Line to neutral regulation may provide advantages over line to line regulation. One such advantage is that line to neutral regulation may provide individual regulation of the current for each phase, potentially allowing control of the line to neutral voltage and providing a fixed neutral reference. This configuration may provide superior voltage regulation with imbalanced load without transformers or additional complexity.

Another advantage that line to neutral regulation may provide is lower DC bus voltage. For example, while line to line regulation at 480V may require a 700V DC bus, line to neutral regulation at 277V may only require a 400V DC bus, while continuing to provide 480V line to line.

As an example, referring to FIG. 3, the line to neutral regulating 3-phase inverter 10 may consist of three single-phase line to neutral inverters 11A, 11B and 11C, configured to provide outputs different by 120 electrical degrees. One side of inverter 11A supplies the output voltage of phase A, one side of inverter 11B supplies the output voltage B and one side of inverter 11C provides the output voltage C, while the other side of the three inverters is connected to the neutral point N Lower DC bus voltages required by line to neutral regulation may reduce the voltage rating and cost of the capacitors to support the DC link. For example, line to neutral regulation at 277V may require a 400V DC bus. A 400V DC bus may require 400 uF of capacitance which may be provided by 400 uF of 450V rated capacitors.

Lower DC bus voltage required by line to neutral regulating inverters may also reduce the required voltage rating of the switches. Lowering the voltage rating of the switches may reduce the switch cost, the on-state resistance of the switch, the forward voltage drop of the switch, the physical size of the switch, the switching time of the switch and other switch characteristics.

For example, a line to neutral regulating inverter outputting 277V may require a 400V DC bus. To provide adequate safety factor, 600V rated switches may be used in this application. When compared to 900V switches, 600V switches may be more available, lower cost, lower on state resistance, lower voltage drop, smaller physical size, faster switching, or more desirable in other ways than 900V switches.

Line to neutral regulation may also require multiple isolated DC busses to provide output voltage. Isolated busses may be required because the neutral of phase A may be tied to the positive DC bus through a switch while the neutral of phase B may be tied to the negative DC bus through a switch. Because the neutrals may be tied together, this dual tie may result in undesirable circulating current within the inverter, difficulty controlling output voltage, and potentially inverter damage.

Connecting the neutrals of the three inverters together may be avoided by installing a transformer on the output of each inverter and connecting the neutrals of the transformer secondary together. Transformers may add losses to the system, reducing the system efficiency, may add size and cost to the system, may increase the total harmonic distortion (THD) of the inverter, may negatively affect the voltage regulation of the inverter, and may require increase in the DC link capacitance of the inverter to support the reactive load.

Isolated busses may be created using an isolating device, such as an isolating DC-DC converter or a transformer on the input to each inverter. The isolating device may provide the isolation to separate busses using a magnetic circuit such as a transformer. Isolating devices on the inputs to the inverters may add losses to the system, increase the size and cost of the system, and may require additional filtering elements on the input to the inverter.

As an alternative to transformers on the output of each inverter and isolating devices on the input to each inverter, each inverter may be supplied by a dedicated isolated bus. The isolated bus may be generated by an isolated winding in an electrical machine, an isolated battery bank, an isolated solar array, an isolated fuel cell, or another isolated source.

While a truly isolated source may provide the risk of electrostatic buildup on stray capacitance, potentially causing electrostatic discharge, or electric shock, isolated sources connected to a line to neutral regulating inverter may have the positive and negative selectively tied to the neutral of the load, providing a reference for the isolated source. In cases where isolation of the neutral is desired, the system may support external high-impedance connections to ground for the isolated sources without damage or improper operation.

Providing isolation on input sources may also allow for detection of ground faults, decreased likelihood of personal electric shock, and improved electromagnetic immunity.

Figure 4:
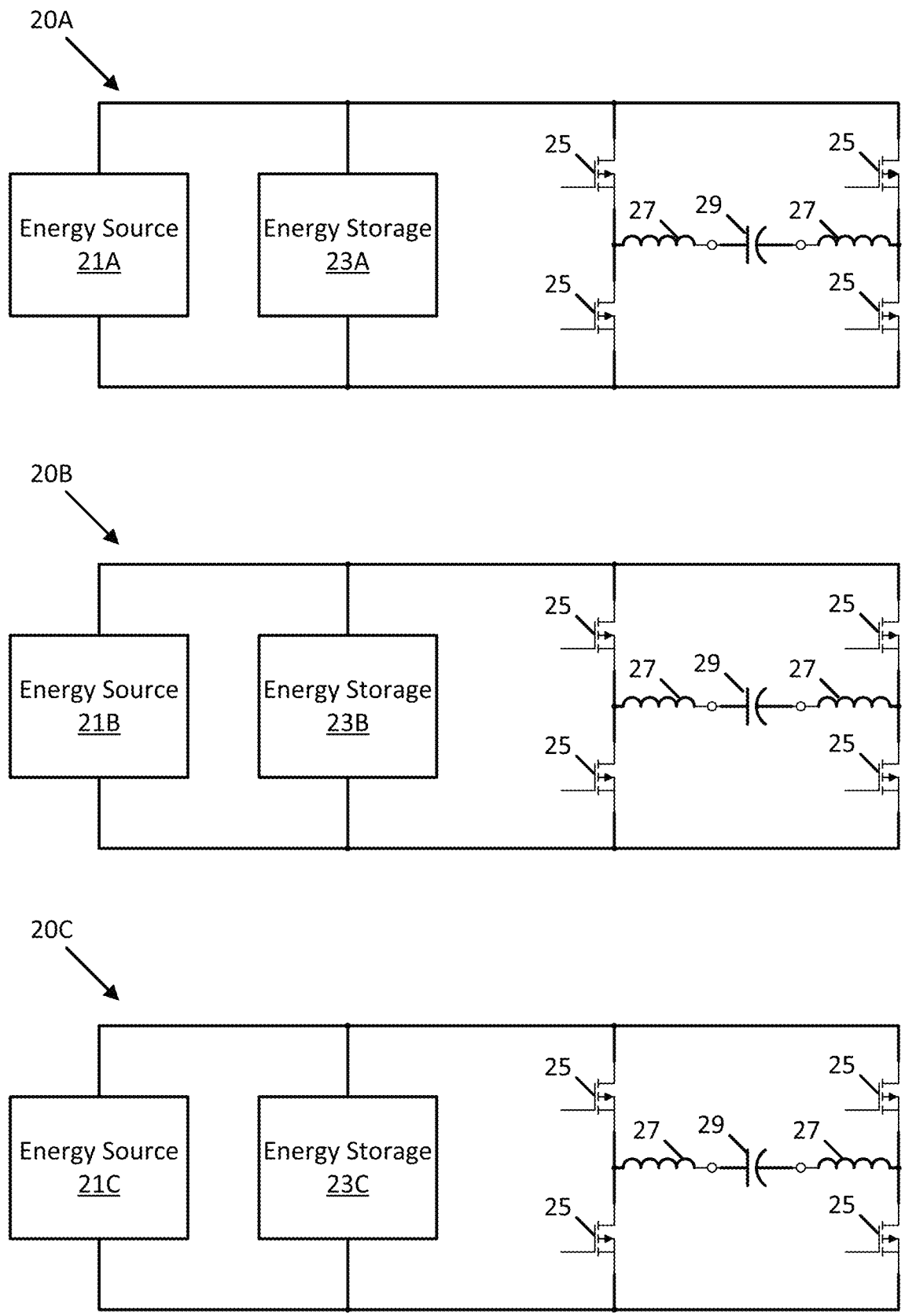
FIG. 4 illustrates an example set of isolated inverter circuits.

FIG. 4 illustrates an example set of isolated inverter circuits 20A-C. The inputs to inverters 20A-C are isolated because there are no electrical connections between them, directly or indirectly. An example of an indirect connection may include connection of the negative DC rail in inverter circuit 20A to ground and also connecting the negative DC rail in inverter circuit 20B to ground. Each inverter circuit includes one or more energy components. While two energy components are illustrated, any number may be included. The energy components may include an energy source 21A-C and/or an energy storage 23A-C. Because they are isolated the energy source and/or energy storage in any inverter circuit is not electrically connected to any components of another inverter circuit. The energy source 21 may include a rectified signal from an electrical machine, an input from a photovoltaic array, a fuel cell, or similar energy source. The energy storage 23 may include a battery, a capacitor, a large rotating mass, a hydraulic or pneumatic accumulator, a heat storage element, or another energy storage element. The electrical machine may be a transformer driven by utility or another source, the electrical machine may be an alternator 31 that provides electric conversion of mechanical energy from a prime mower such as an internal combustion engine, a wind turbine, a hydroelectric turbine, or another source of mechanical energy. References to alternator 31 contained herein may refer to any electrical machine or machine utilizing electromagnetic induction for transfer of power.

The fuel cell may be configured to convert the chemical energy from a fuel into electricity through an electrochemical reaction. The reaction may be between hydrogen fuel with oxidizing agent such as oxygen.

Each inverter circuit 20 includes a set of switches 25. The switches may be any type of transistor or other current interrupting device. In one example, a microelectromechanical system (MEMS) relay or nanoelectromechanical relay may be used. The isolated inverter circuits provide control of individual output currents by selectively activating switches 25 in sequence to increase or decrease current on associated outputs. The inverters may be configured to control either current or voltage. The inverters may be configured to operate in parallel with the electrical grid or in an islanded condition, where the inverter supplies sufficient power to meet the demands of site-specific loads. When operating in grid tied mode, the inverters may control power output to the grid or provide some type of microgrid control, such as CERTS. In an islanded condition, the inverters may be configured to control voltage and frequency or to limit output current.

A controller 24 may be operatively connected to the set of switches 25 and send command signals to the switches to turn each switch on and off at specified times. The switches may be arranged in pairs. A pair of switches electrically connects an output to either the positive DC rail or the negative DC rail. The output of each inverter circuit may be provided across capacitor 29, which may be connected to each pair of switches via inductors 27. The capacitor 29 and inductors 27 provide filtering for the output to reduce the electromagnetic emissions conducted by the high-frequency inverter switching and reducing the total harmonic distortion (THD) of the output. The capacitor 29 and inductors 27 may be omitted in one or all of the inverter circuits 20A-C.

Figure 5:
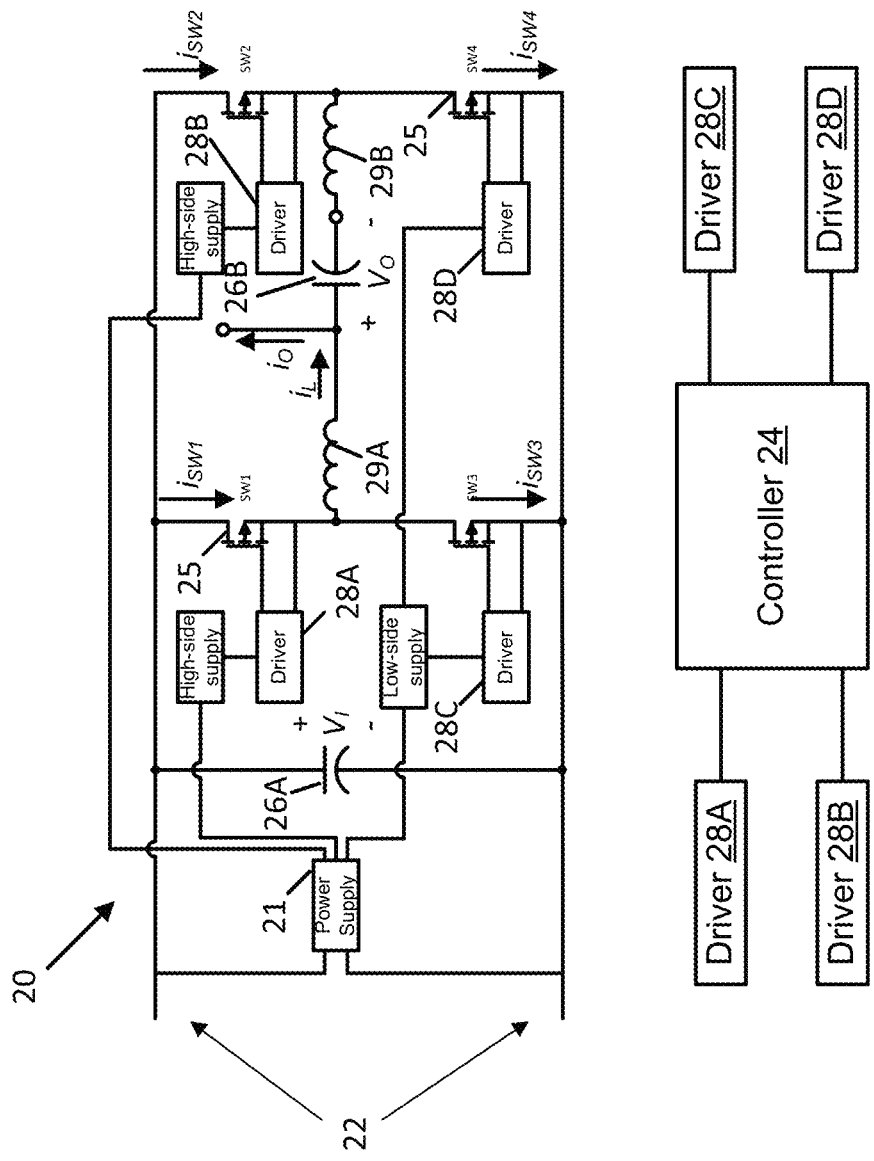
FIG. 5 illustrates an example implementation of an inverter circuit.

FIG. 5 illustrates an example implementation of an inverter circuit 20 in which the set of switches are designated SW1, SW2, SW3, and SW4. A power supply 21 provides a high side supply and a low side supply. Each switch may be driven by a driver circuit 28, which may include isolated circuitry (e.g., optical, magnetic, or another) to allow the controller 24 to activate and de-activate each switch individually. The isolated circuitry shields the controller 24, which may include one or more microprocessors, from the high voltage of the DC bus using magnetic or optical signals to electrically isolate. The driver circuits 28 and isolation circuitry are connected to either the high side supply or the low side supply, which are separate power supplies for the driver circuits 28. FIG. 5 illustrates that each inverter has an H bridge and an incoming source connected to the DC bus. The controller 24 may be included and/or integrated with the inverter circuit 20. For the ease of illustration, controller 24 is drawn separate from the circuit and connected to the driver circuits 28.

In this example, eight electrical quantities may be measured by one or more sensors and provided to the controller 24. The electrical quantities may include the current through SW1 ($i_{sw1}$), the current through SW2 ($i_{sw2}$), the current through SW3 ($i_{sw3}$), and the current through SW4 ($i_{sw4}$), the current through inductor 29A ($i_L$), the current to the output ($i_O$), the output voltage across capacitor 26B ($V_O$), and the input voltage across capacitor 26A ($V_i$). Each electrical quantity may be measured by a voltage sensor, a current sensor, or another type of sensor.

The system in FIG. 5 may be controlled by the inverter controller 24 in a variety of different ways, including open-loop control, closed-loop correction, or real-time proportional-integral-derivative (PID) control. Open loop control may involve sending a pulse-train to the output switches SW1-SW4 based on an input signal. Closed-loop correction may involve adjusting the open-loop pulse train based on a measurement of an output signal. Real-time PID control may involve adjusting the duty cycle of each cycle of the inverter based on logic involving an output signal and an input signal.

The signal used by the controller 24 may be a digitally computed signal, an analog signal, a signal stored in internal data memory, a signal digitally communicated to the inverter or another signal. The signal may be a sinusoidal waveform, a modified sine waveform to improve THD, or another waveform.

Figure 6:
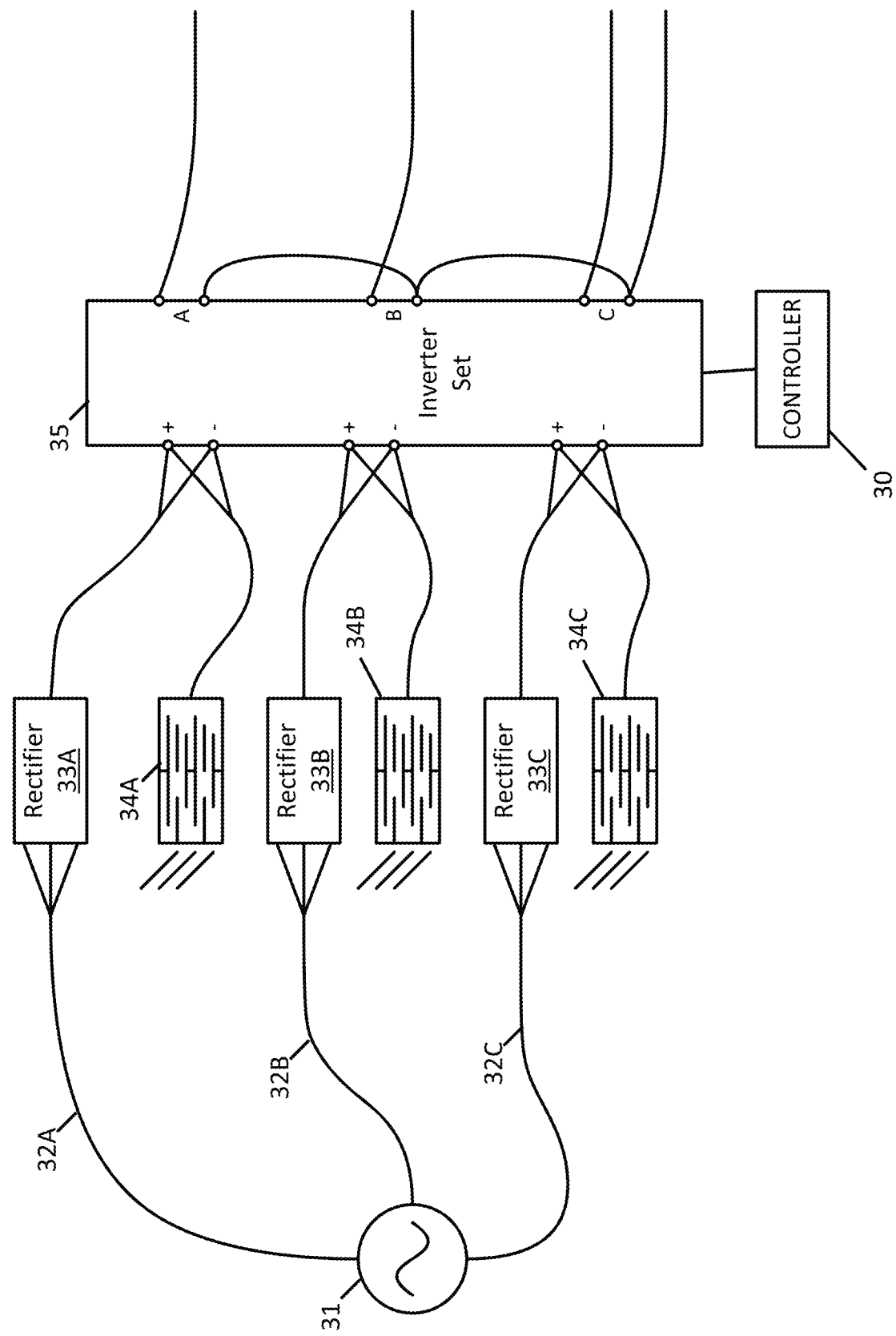
FIG. 6 illustrates a system for the isolated inverters.

FIG. 6 illustrates a system for the isolated inverters. The system includes an alternator 31, one or more rectifiers 33A-C, one or more storages elements 34A-C or DC sources, an inverter set 35, and a controller 30. Additional, different, or fewer components may be included.

The alternator 31 may be part of an engine-generator set, which may be referred to as a generator or a genset, may include an engine to operate the alternator or another device for generating electrical energy or power. The alternator 31 may be a nine phase alternator, and each output line 32A-C includes three electrical conductors for a three phase signal to be provided to rectifiers 33A-C. Each electrical output 32A-C may be isolated from the other outputs. As an example, output 32A may be isolated from output 32B and output 32C.

The rectifiers 33A-C are configured to convert the three phase signal to DC output. The rectifiers 33A-C may include any combination of diodes, silicon controlled rectifiers (SCRs), field effect transistors (FETs), insulated gate bipolar transistors (IGBT), synchronous rectifying FETs, or current interrupting device. In one example, the rectifiers 33A-C may include any circuit element or combination of circuit elements that transforms three phase AC Input to DC output.

The inverter set 35 may include multiple isolated inverter circuits. Example inverter circuits are illustrated in FIGS. 4 and 5. The inverter set 35 may be monitored and controlled by controller 30. The output of inverter set 35 is a three phase output signal. The three outputs A, B, and C from the inverter set 35, for example, correspond to the three capacitors 29 in inverter circuits 20A-C in FIG. 4.

The isolation between the inverters may result in loading differences between the three isolated busses. Some applications may include controlled loading among the busses. This controlled loading may be to create a balanced loading condition on all three busses (e.g. to charge/discharge the energy storage elements at the same rate) to equalize life of components, normalize efficiency, or for another reason. This controlled loading may be to an unbalanced loading condition (e.g. to adjust the voltage of the isolated busses to different set points) to track an optimal power condition for each power source connected to a bus or for another reason. This balancing may require an isolation device, but this isolation device may only be active in an imbalanced condition. Although the isolation device may have losses and thereby decrease the efficiency of the system, balanced full-load efficiency may not be significantly affected by the losses in the isolation device if it is not active.

There are examples when balanced loading is ideal—e.g. to charge/discharge energy storage elements uniformly. There are times when unbalanced loading is ideal—e.g. to adjust bus voltage to track an optimal condition on an energy source or storage element. Examples of the latter case are when all 3 energy storage elements are differently sized or one bus source is operating in a higher ambient temperature than the other two.

In the case where the DC bus isolation is provided by isolation devices, the power may flow through the isolation devices at all times, potentially providing the highest losses at a full load condition. Thus, the isolated bus inverter embodiments described herein may operate at higher efficiency.

Figure 7:
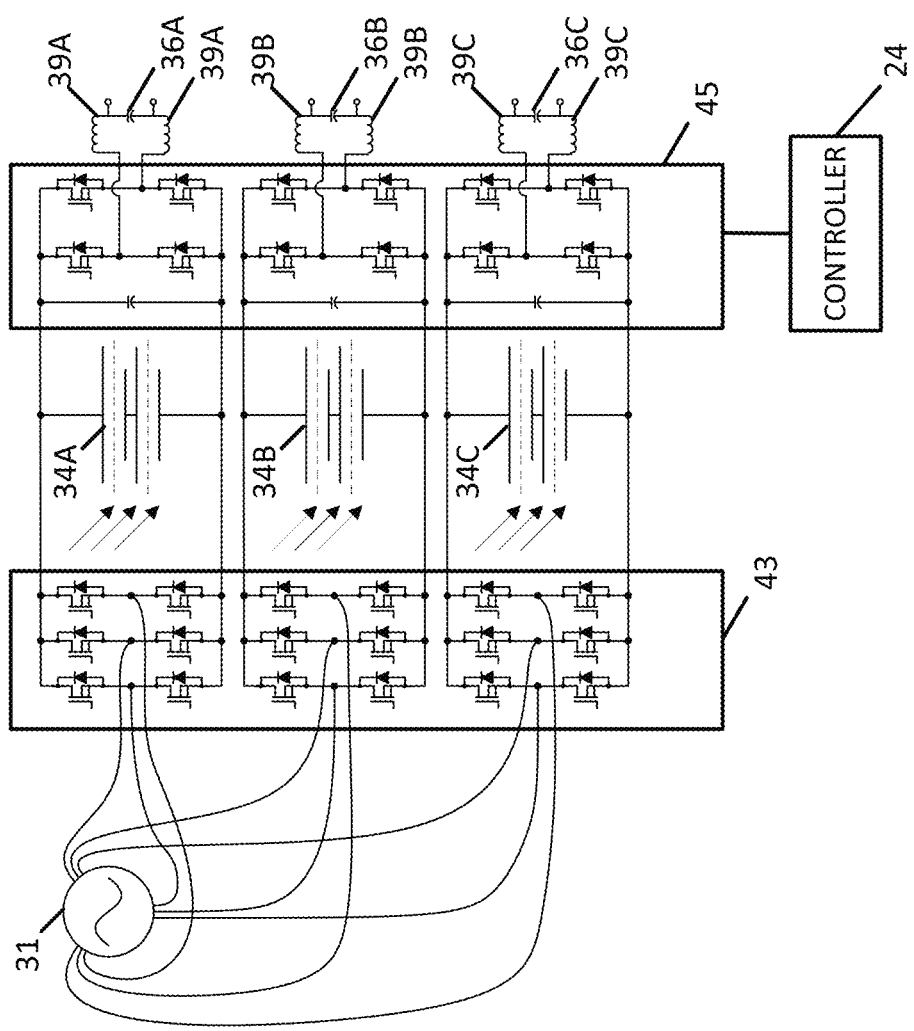
FIG. 7 illustrates another example system for the isolated inverters circuits and sources.

FIG. 7 illustrates another example system for the isolated inverters circuits and sources. An alternator 31 is connected to a synchronous rectifier array 43. Each phase of the synchronous rectifier array 43 includes six transistors (e.g., FETs or IGBTs) that conduct in at least two directions. In one direction the synchronous rectifier array 43 converts the AC signals from the alternator 31 to DC signals, which are combined with the DC signals from the fuel cells 34A-C. The inverter set 45 is controlled by timings from the controller 30 to invert the DC signals to a controlled three phase AC output across capacitors 36A-C, which may be connected through inductors 39A-C.

Use of a synchronous rectifier 43 may reduce the losses in the system normally associated with selective conduction through a diode. When conducting in the forward direction, diodes have forward voltage drop, while switches may have notably lower forward voltage drop at a given current. As an example, a FET may have 0.1V drop when conducting 100A, while a diode may have 1.5V. The FET may dissipate 10 W of heat, while the diode may dissipate 150 W of heat. The additional heat dissipated by the diode may have a negative effect on the efficiency of the system.

The loads may be controlled through the alternator 31. The coils in the alternator 31 may be electrically isolated, but not magnetically isolated, providing a path for electromagnetic induction between the windings. In this case, power may be transferred from one isolated bus to another through the alternator 31. Power transfer through the alternator may serve to equalize the loading on the isolated busses even if there is no DC current path (e.g. the isolated busses are electrically isolated).

In addition, load may be controlled among the isolated busses by operating the alternator 31 as a motor through the synchronous rectifier, providing power to the engine shaft. This may accelerate the engine or provide additional voltage on a different isolated output. This mechanism may provide power equalization even if the load is imbalanced, allowing the engine to accelerate to store energy that is not needed by any of the three inverters in the inverter set 45.

In cases where each DC bus is connected to a sufficiently large energy storage device to allow storage of transient power surges from the load, there may be no need to transfer power to the rotating shaft in the alternator, but in cases where the charge or discharge energy or energy rates exceed this storage capacity, the alternator rotor can be used to direct or store this additional energy.

In addition, the inverter set 35, or inverter circuits 20A-C, may provide a load bank. The inverter set 35, or inverter circuits 20A-C may be connected to generators (engine generator sets) and provide power to a grid in multiple locations of a building. The inverters are bidirectional and configured to sink or source power to the grid.

The invertors may suddenly (e.g., within a small time period) change the load on the generator, while allowing the frequency and/or voltage of the generator output to change. The inverter circuit provides a DC signal to a DC bus or the grid or utility through the DC bus.

For example, a one step transient test may be applied to the generator, which provides all power to the grid during the transient test. As the generator is recovering, the power goes down, then subsequently returns to full power. If the generator was directly connected to the utility, the utility would take up some of the load until the generator has had time to spool up and reach operating speed. If the generator is divorced or isolated from the utility through the DC link of the inverter, load is applied to the generator without wasting power as resistive heat.

The bi-directional AC-DC inverter may be connected to the utility and provide a DC bus that is distributed through a house, a building, a campus, or another site. Multiple generators may be connected to the site through inverters at different places. The controller 30 may be configured to send a command signal to the inverters to set a load. The inverter adjusts the impedance of the inverter circuit to act as a particular inductor and resistor combination. The command signal may include a value for an inductance and/or resistance. The command signal may include a value for a percentage of full load. The inverter provides the power to the utility.

In another embodiment, the inverter may provide a capacitive element or inductive element in the case where the load on the generator is highly capacitive. The controller 30 may be configured to send a command signal to the inverters to set a capacitive load. The inverter acting as a capacitive element can allow the generator to supply the capacitive load.

Figure 8:
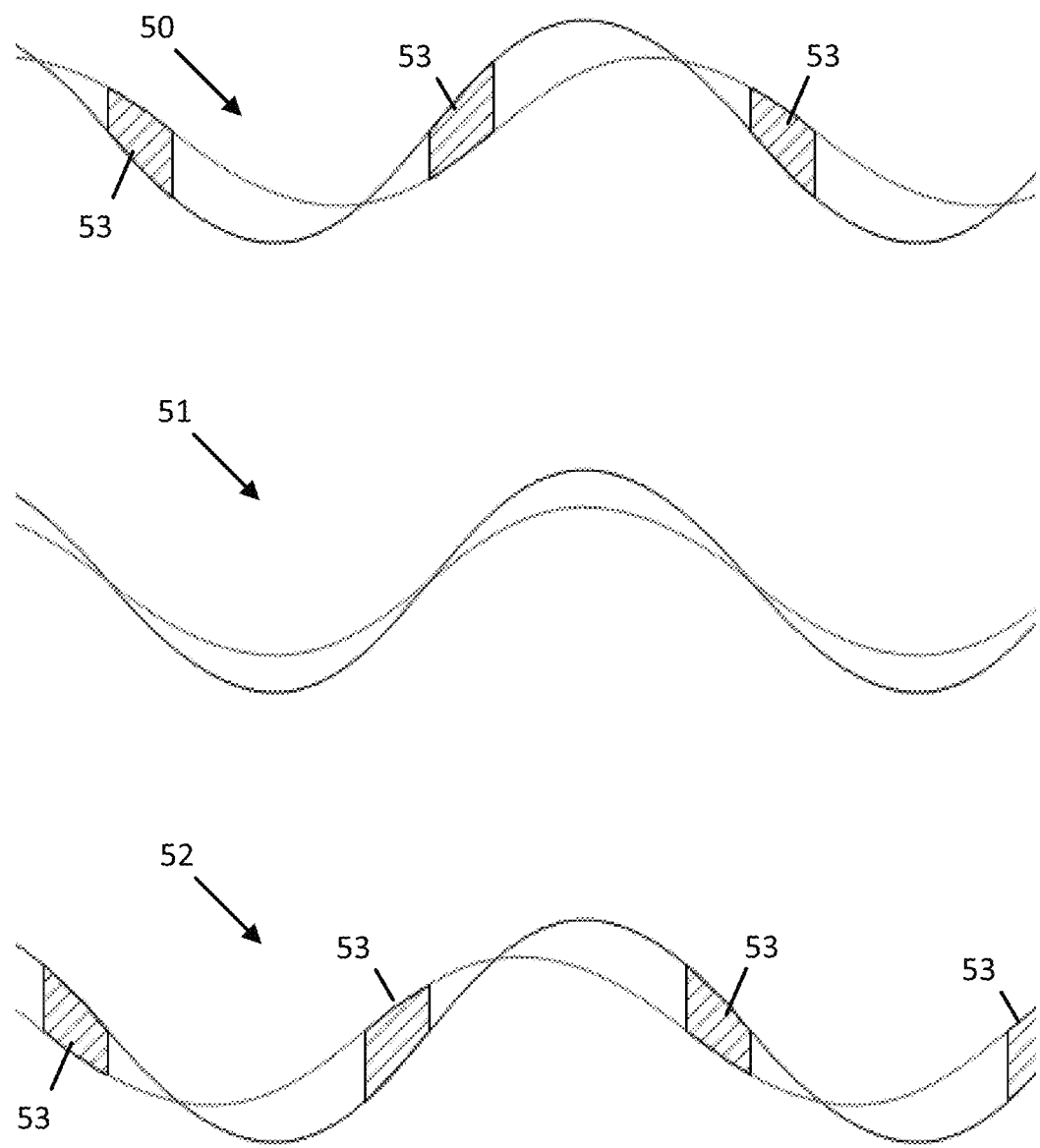
FIG. 8 illustrates a set of example voltage and current waveforms that an inverter may generate.

FIG. 8 illustrates a set of example voltage and current waveforms that an inverter may generate. Curve 50 illustrates a case where the load has a 0.8 power factor where the current lags the voltage. Curve 51 illustrates a curve where the voltage and current lie directly in phase. Curve 52 illustrates a curve where the load has a 0.8 power factor where the current leads the voltage. The shaded region 53 on curves 50 and 52 illustrates a time that the inverter is absorbing energy from the load. The energy that the inverter absorbs may be stored in energy storage in the inverter, energy storage connected to the DC bus, the inertia of the rotating shaft in the alternator, or another connected source or storage device.

In one example, a particular switch (e.g., SW1) is ON, which would normally cause current to flow through the switch in the positive direction (e.g., in the direction of the arrow for $I_{SW1}$ in FIG. 5), however current is flowing in the negative direction at $I_L$ (e.g., in the opposite direction of the arrow for $I_L$ in FIG. 5). This current through the inductor of the output filter 29A causes a reverse current through the switch SW1, charging the DC bus. Power is going from the load or output filter and going into DC bus. Instead of transferring power from the source to the load, power is flowing from the load to the source. This is a problem because many energy sources are not designed for such reverse flow. Some sources can handle the reverse flow such as a battery, but some sources cannot handle the reverse flow such as a fuel cell.

To avoid reversing the direction of power flow to devices that may be incompatible with reverse power flow, such as fuel cells, the current may be diverted to flow into the alternator. The alternator accelerates the engine in response to reverse flow from the load. Effectively the engine is used for energy storage. But the reverse flow and the energy storage is only momentary. In one example, the energy is stored in the engine for a few milliseconds and speeds up the engine by a few revolutions per second. In some examples, this technique may conserve power as the energy stored in the engine is transferred to other loads, conserving power and ultimately saving fuel. More importantly, this technique saves cost because capacitor bank is smaller or not needed. Note that the energy stored in the engine is much larger than this reverse energy stored in the capacitor bank, so the operation and control of the engine may be substantially unaffected.

If the energy absorbed from the load is not stored in an energy storage device, the energy may result in excessive voltage on the DC bus, potentially damaging the inverter. To avoid this risk, the DC link capacitor 26A may be sized to store this maximum energy (resultant at 0 power factor, rated output current). This may increase the size and cost of the DC link capacitor. Using the rotating shaft in the alternator to store additional energy may reduce the size of the DC link capacitor 26A and thereby the cost, size and complexity of the inverter system.

To remove power from the isolated bus and provide it to the alternator 31, the synchronous rectifiers in the rectifier array 43 may be operated in reverse, conducting current when the applied voltage from the alternator is lower than the DC bus voltage. This reverse operation may require different control of the rectifiers, but may not involve any additional circuitry in the synchronous rectifiers in the rectifier array 43.

To remove power from an isolated bus and provide it to other isolated busses, the synchronous rectifier in the synchronous rectifier array 43 may be switched at a high frequency (e.g. 100 kHz) to provide current to the other busses through magnetic induction between electrically isolated windings without applying a noticeable torque to the alternator rotor. This technique may not rely on the alternator rotation to produce this effect, but may couple current through the alternator when the alternator is not turning.

Referring back to FIG. 5, a shoot-through condition may exist when both switches for any pair of switches are both turn on at the same time. For example, if both SW1 and SW3 are on, the DC bus 22 positive and negative are shorted together. Similarly, if both SW2 and SW4 are on the DC bus 22 is also shorted.

In some implementations, a safe delay period called an anti-shoot-through delay may be applied after turning off one of the pair of switches and before turning on one of the pair of switches. During this delay period, current in inductive elements may continue to flow through the body diodes of some of the switches, providing a path for the current.

In some cases, especially applications where high system efficiency is important, the voltage drop across a conducting switch may be significantly lower than the voltage drop across the body diode. For example, the source to drain voltage drop on a FET may be 0.15V when supplying 225A, while the forward drop on a diode may be 1.7V when providing 225A. The FET may dissipate 34 W in this example, while the diode may dissipate 382 W. While only for a short duration (during the anti-shoot-through delay), the losses may be appreciable in the system, especially at high switching frequency and for high-efficiency systems.

While FETs may exhibit significantly lower source-drain voltage than their associated body diodes, IGBTs may have similar emitter-collector voltage in the on state to the forward voltage drop across a body diode, based on the semiconductor junctions inside the device that are biased to turn it on, meaning that anti-shoot-through delay may not have a noticeable effect on efficiency with IGBTs.

Reducing the anti-shoot-through delay may improve efficiency until the delay is so short that both switches are conducting simultaneously. This short circuit on the power supply may increase heat dissipation in the switches and reduce the system efficiency. While an optimal anti-shoot through timing may be obtained at a given moment in time, the switch timing may vary with incident current levels, temperature of the part, load characteristic and other factors to the point where it is very difficult to arrive at optimal timing for all conditions. In addition, each part may exhibit different switching characteristics due to manufacturing variances in the component, further complicating the difficulty of selecting an ideal anti-shoot-through delay.

The risk of thermal damage due to heating from the body diode is often lower than the risk of damage from shoot-through current (current conducted through both switches in the on state). In some cases, shoot-through may result in catastrophic failure of switches in the inverter as well as the potential to damage supply and filter elements on the DC bus of the inverter. Due to the risk analysis, the anti-shoot-through delay is often adjusted to the maximum anti-shoot-through time required if all component tolerances stack to fastest turn on and slowest turn off. In some cases, there may be an additional delay added to provide a safety factor in this scenario to prevent catastrophic failure that may result from a shoot-through condition.

While additional heat dissipation may not be a concern in applications where efficiency is a lower priority or in applications where IGBTs are used instead of FETs, the additional losses from excessive anti-shoot-through delay may make a noticeable difference in high efficiency applications. Thus, applications requiring high efficiency may benefit from dynamic adjustment of anti-shoot-through delay.

Dynamic adjustment of anti-shoot-through delay may allow more ideal anti-shoot-through timing without presenting the risk of catastrophic damage due to excessively low anti-shoot-through delay allowing shoot-through. Early detection of miniscule shoot-through current may allow adjustment quickly enough to prevent damage to components. If adjustment occurs quickly enough, the anti-shoot-through delay may be dynamically optimized under every operating scenario and with a broad variety of switches.

The controller 24 may first access a default anti-shoot-through delay time period from memory. The default anti-shoot-through delay may be stored from previously learned characteristics of the inverter switches. The default anti-shoot-through delay may be calculated based on a variety of measured parameters, learned behavior and pre-programmed values. The default delay may be learned during a break-in period for the inverter. The default anti-shoot-through delay may be programmed as the result of a specific factory test.

The anti-shoot-through delay may be negative under certain circumstances, such as the case where a switch turn on time is noticeably longer than the turn-off time. This is more typical at lower DC bus voltages, but may occur in cases where an inverter is operated at a reduced voltage. In most cases, the switch turn-off time is longer than the switch turn-on time, meaning that the anti-shoot-through delay is required to prevent both switches conducting simultaneously. IGBTs may have a significant difference between turn-on and turn-off times FIGS. 9A-9D illustrates example switching voltage and current waveforms for anti-shoot through conditions. The current displayed is through the switching element, disregarding the body diode. In addition, the current is corrected to positive through both switches (measuring—iSW3).

Figure 9A:
FIG. 9A illustrates example FET switching waveforms.

FIG. 9A illustrates example FET switching waveforms, with gate-source voltage applied by a driver circuit 101, 103 and the corresponding current profile through the FET 102, 104. The left portion of the curve illustrates the turn-off characteristics, while the right portion of the curve illustrates turn-on characteristics. Body diode current is not included in this illustration.

Figure 9B:
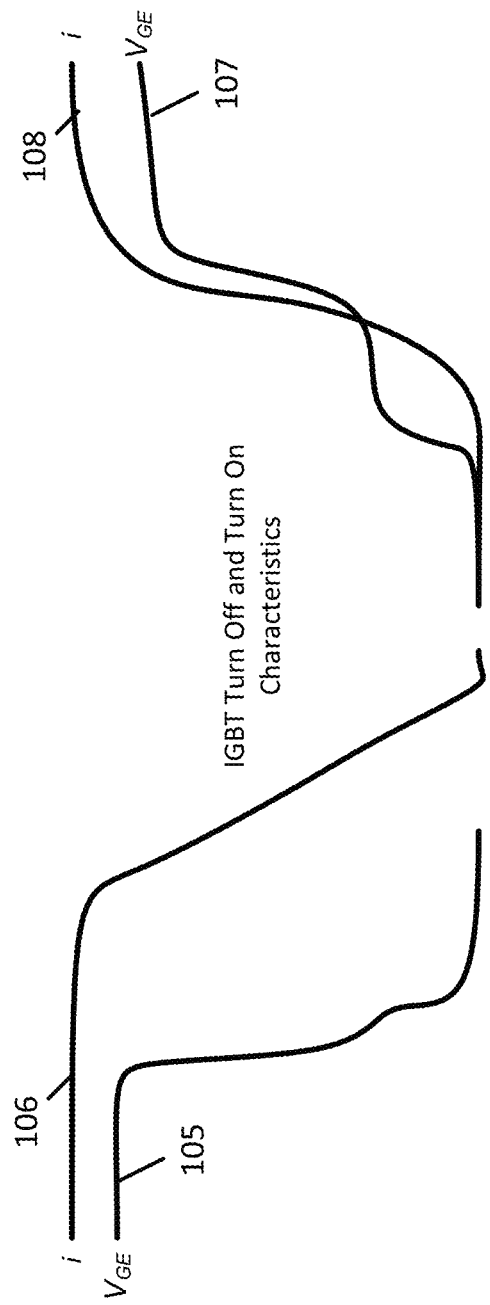
FIG. 9B illustrates example IGBT switching waveforms.

FIG. 9B illustrates example IGBT switching waveforms, with gate-emitter voltage applied by a driver circuit 105, 107 and the corresponding current profile through the IGBT 106, 108. The left portion of the curve illustrates the turn-off characteristics, while the right portion of the curve illustrates turn-on characteristics. Body diode current is not included in this illustration.

Figure 9C:
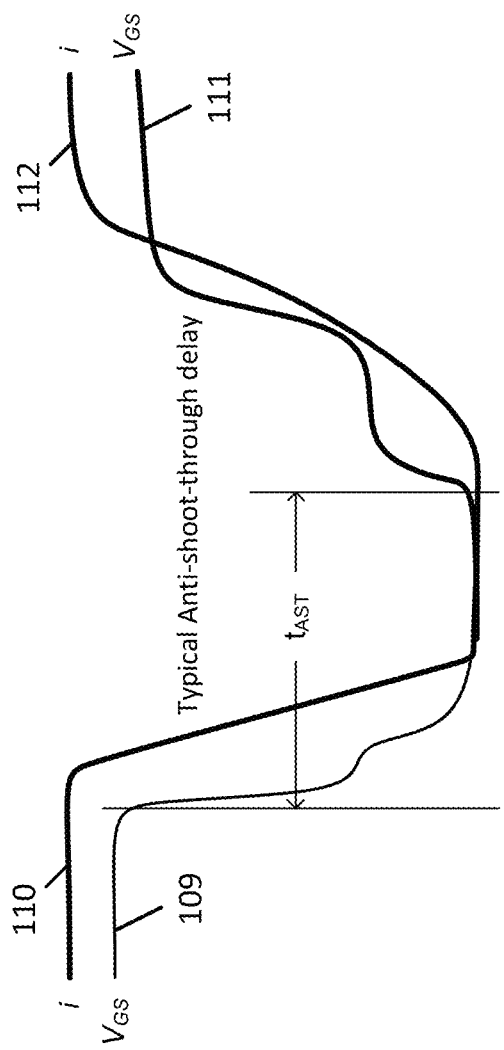
FIG. 9C illustrates example FET switching waveforms.

FIG. 9C illustrates example FET switching waveforms with a typical anti-shoot-through delay applied on a system without dynamic adjustment of anti-shoot-through, with gate-source voltage applied by a driver circuit 109, 111 and the corresponding current profile through the FET 110, 112. The left portion of the curve illustrates the turn-off characteristics of SW1, while the right portion of the curve illustrates turn-on characteristics of SW3 (with current $I_{SW3}$ inverted). Body diode current is not included in this illustration.

Figure 9D:
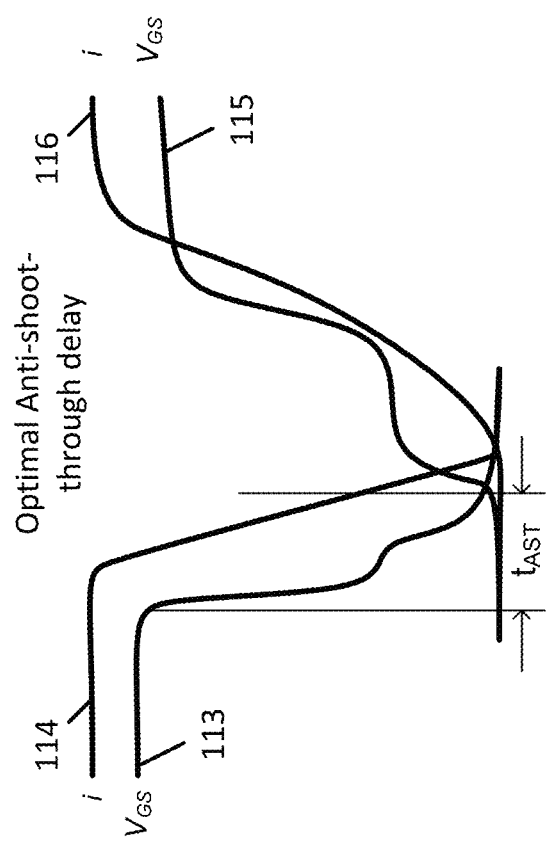
FIG. 9D illustrates example FET switching waveforms with a typical anti-shoot-through delay.

FIG. 9D illustrates example FET switching waveforms with a typical anti-shoot-through delay applied on a system with dynamic adjustment of anti-shoot-through, with gate-source voltage applied by a driver circuit 113, 115, and the corresponding current profile through the FET 114,116. The left portion of the curve illustrates the turn-off characteristics of SW1, while the right portion of the curve illustrates turn-on characteristics of SW3 (with current ISW3 inverted). Body diode current is not included in this illustration.

An example embodiment where the anti-shoot-through is dynamically adjusted is considered with respect to FIG. 5. The controller 24 is configured to monitor the electrical parameters of the inverter circuit such as at least two of the current of $I_{SW1}$, the current of $I_{SW2}$, the current of $I_{SW3}$, and the current of $I_{SW4}$. The controller 24 may also monitor the inductor current $I_L$, output current $I_L$, the input voltage $V_i$, and/or the output voltage $V_o$. The controller 24 is configured to compare one or more of the electrical parameters with each other and/or with a threshold value. Based on the comparisons, the controller 24 may determine whether the time period should be increased or decreased. The controller 24 may repeat the process to incrementally make adjustments to the time period.

The controller 24 may determine whether a shoot-through switching condition is present. The shoot-through switching condition occurs when one of the switches in a pair of switches is being transitioned from ON to OFF and the other switch in the pair of switches is being transitioned from OFF to ON.

In the example of FIG. 5, the shoot-through switching condition may occur in four scenarios (1) SW1 is turning ON and SW3 is turning OFF, (2) SW1 is turning OFF and SW3 is turning ON, (3) SW2 is turning ON and SW4 is turning OFF, or (4) SW2 is turning OFF and SW4 is turning ON.

The controller 24 performs different comparisons depending on the current direction and switching scenario of the inverter circuit. The controller 24 may incrementally reduce the delay time period until a shoot-through trigger is detected for a particular scenario. For example, the controller 24 may select the initial default time period and reduce the default time period by a time reduction value every cycle of the switching control signal, or every predetermined number of cycles, until a shoot-through condition is detected.

In scenario (1), when SW1 is turning ON and SW3 is turning OFF, a shoot-through condition is detected when the sign of the current through switch 1, $I_{sw1}$, is in the same direction and above a noise threshold of the current through switch 3, $I_{sw3}$.

In scenario (1), when SW1 is turning ON and SW3 is turning OFF, a shoot through condition is detected when the sign of the current through switch 3, $I_{sw3}$, increases more than a threshold amount in a sample time period. The threshold amount may be a current value, like 5A, a percentage of system current, like 2% or other values determined by characteristics of the system. The sample time period may be a fixed time, such as 10 ns or a factor of the switching frequency of the inverter, such as 1000 times the switching frequency. The controller 24 may compare consecutive samples of $I_{sw3}$, or a series of samples, to determine when the amplitude of $I_{sw3}$ is increasing more than the threshold amount. The controller 24 may extrapolate shoot-through current based on a rate of change in the measure values. The controller 24 may also monitor other system parameters, such as the voltage across each switch.

In scenario (1), when SW1 is turning ON and SW3 is turning OFF, a shoot-through condition is detected when the sum of the current through switch 1, $I_{sw1}$, and the current through switch 3, $I_{sw3}$, deviates from the inductor current $I_L$. The controller 24 may first compute the difference $I_{sw1}-I_{sw3}$, and then subtract $I_L$ from the sum, or the absolute value of the sum. When the difference is greater than a predetermined value, the shoot through trigger is detected.

Scenarios 2 through 4 are similar to scenario 1, with different switches. In any of these examples, if a shoot-through condition is detected, the controller 24 may either increase the delay time period or stop the incremental decreasing of the delay time period. The determination of behavior may be dependent on the severity of the detected shoot-through condition.

The anti-shoot-though delay time period may be adjusted every cycle of the control signal for the switches. In some loading conditions, the current though the switches may be in the opposite direction as expected. For example, if the current is traveling left through the filter inductor 29A while switch 1 is active, the current is flowing in an unexpected direction. In this case, the anti-shoot-though condition may be detected by a positive current in SW1 when current IL is negative. In this case, the anti-shoot through condition can still be detected by summing the current through SW1 and SW3 to determine if the total is greater than the inverse of the inductor 29A current IL.

The controller 24 may also identify at least one opposite scenario, in which the controller 24 would decrease the time delay. As an example, the controller 24 may also be connected to a temperature sensor associated with switch (e.g., near the corresponding body diode). The controller 24 may monitor a temperature associated with a switch when the switch is turned off. An increase of temperature indicates that the body diode is conducting current and heating up. An alternate example would be a periodic incremental decrease of the anti-shoot-through time.

Figure 10:
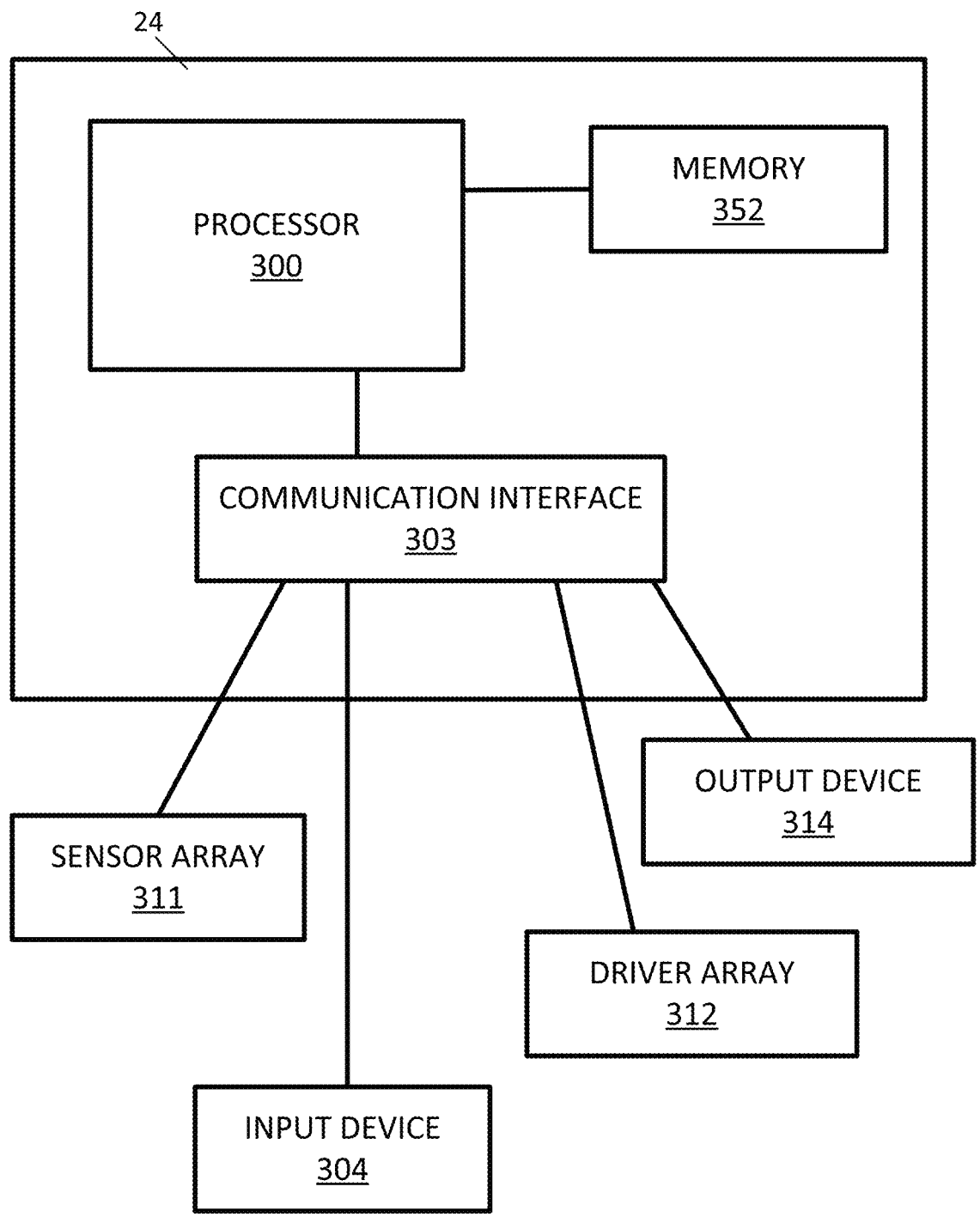
FIG. 10 illustrates an example controller for operating isolated inverters.
Figure 11:
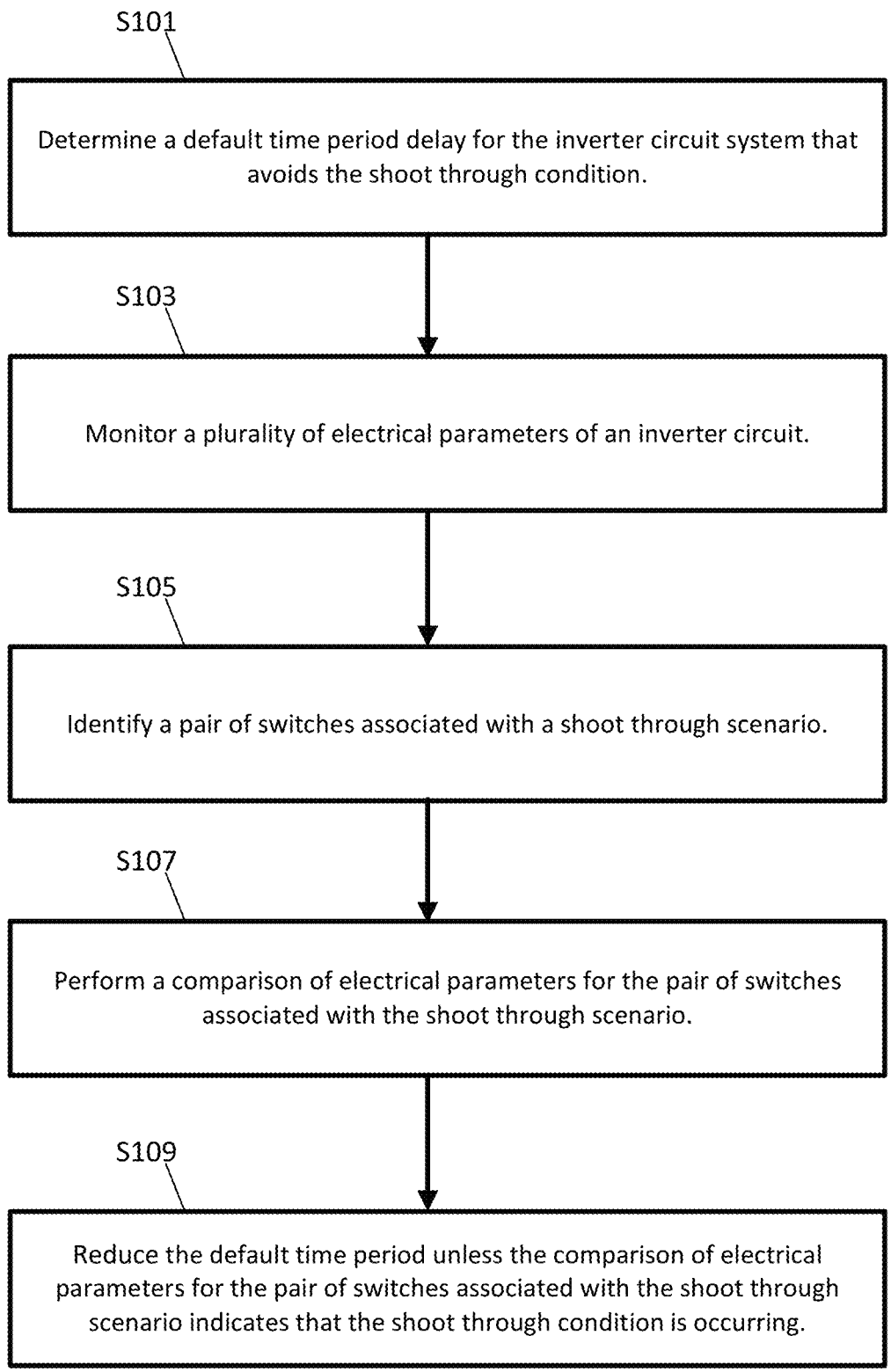
FIG. 11 illustrates a flow chart for the operation of the inverter controller.

FIG. 10 illustrates an example controller 24. The controller 24 may include a processor 300, a memory 352, and a communication interface 303. The controller 24 may be connected to a workstation or another external device. The controller 24 may be connected to an input device 304 such as a control panel and/or a database for receiving user inputs, system characteristics, and any of the values described herein. The controller 24 may be connected to an output device 314, which may be integrated with the input device 304 as the control panel and may display settings or measurements of the controller 24. The communication interface 303 may be connected to a sensor array 311 including any one or combination of the sensors and receive sensor measurements as described above. The communication interface 303 may be connected to a driver array 312 for driving and controlling any of the switches in the inverters. Additional, different, or fewer components may be included. The processor 300 is configured to perform instructions stored in memory 352 for executing the algorithms described herein. FIG. 11 illustrates a flow chart for the operation of the inverter controller 24. Additional, different of fewer acts may be included.

At act S101, the controller 24 determines a default time period delay for the inverter circuit system that avoids the shoot through condition. The default time period delay may be set by a user through input device 304 or accessed from memory 352. The default time period may be selected according to a type of switch or a property of the switch. The controller 24 may calculate the default time period delay using historical data for past performance of the switches. The controller 24 may perform a transient test on the switches and measure a response in order to calculate the default time period delay.

At act S103, the controller 24 monitors a plurality of electrical parameters of an inverter circuit. The electrical parameters may include voltages, currents, inductances, or capacitances associated with one or more elements of the inverter circuit.

At act S105, the controller 24 identifies a pair of switches associated with a shoot-through scenario. The shoot-through switching condition occurs when one of the switches in a pair of switches is being transitioned from ON to OFF and the other switch in the pair of switches is being transitioned from OFF to ON. The controller 24 may monitor command signals sent to the switches in order to identify the switches associated with the shoot-through condition.

At act S107, the controller 24 performs a comparison of electrical parameters for the pair of switches associated with the shoot through scenario. At act S109, the controller 24 reduces the default time period unless the comparison of electrical parameters for the pair of switches associated with the shoot through scenario indicates that the shoot through condition is occurring or there is a risk of electrical parameters for the pair of switches associated with the shoot through scenario occurring.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 303 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:

1. An isolated bus inverter system comprising:
 a plurality of inverter circuits including a switching array and each inverter circuit of the plurality of inverter circuits configured to provide a respective alternating current (AC) phase signal of a polyphase AC signal to an output, wherein each of the plurality of inverter circuits is connected to a respective energy source supplying a direct current (DC) signal via a respective DC bus, wherein each respective energy source and DC bus of the plurality of inverter circuits is isolated on respective input sides of the plurality of inverter circuits from the respective energy sources and DC buses of other inverter circuits of the plurality of inverter circuits;

a controller configured to generate timing signals for the plurality of inverter circuits to generate the respective AC phase signals for the output based on signals received from the respective energy sources;

a plurality of synchronous rectifier circuits configured to each supply respective DC signals to respective ones of the plurality of inverter circuits; and an alternator configured to provide AC power to the plurality of synchronous rectifier circuits via respective alternator windings;

wherein the plurality of synchronous rectifier circuits are configured to operate in reverse to drive the respective alternator windings to transfer power to at least one of the respective DC buses.

2. The isolated bus inverter system of claim 1, wherein at least a first one of the plurality of inverter circuits is configured to provide a first AC signal and at least a second one of the plurality of inverter circuit is configured to provide a second AC signal.

3. The isolated bus inverter system of claim 1, wherein the respective energy sources each comprise a fuel cell.

4. The isolated bus inverter system of claim 1, wherein at least one of the plurality of inverter circuits includes an energy storage device.

5. The isolated bus inverter system of claim 1, wherein at least one of the plurality of inverter circuits includes a set of switches for controlling an output for the at least one of the plurality of inverter circuits.

6. The isolated bus inverter system of claim 5, wherein the set of switches includes a positive switch for connecting the output of the at least one of the plurality of inverter circuits to a positive rail and a negative switch for connecting the output of the at least one of the plurality of inverter circuits to a negative rail.

7. The isolated bus inverter system of claim 6, wherein the controller is configured to send instructions to an isolated driver circuit for driving the set of switches, wherein the controller is configured to generate an anti-shoot through delay period for the set of switches that waits for the anti-shoot through delay period between turning off one switch of the set of switches and turning on another switch of the set of switches.

8. The isolated bus inverter system of claim 7, wherein the controller monitors characteristics of the set of switches and the anti-shoot through delay period is generated based on the characteristics.

9. The isolated bus inverter system of claim 8, wherein the controller identifies a shoot through scenario and selects the anti-shoot through delay period in response to the shoot through scenario.

10. The isolated bus inverter system of claim 1, further comprising:

a filter configured to reduce total harmonic distortion of the output.

11. An isolated bus inverter system comprising:

a plurality of inverter circuits including a switching array and each inverter circuit of the plurality of inverter circuits configured to provide a respective alternating current (AC) phase signal of a polyphase AC signal to an output, wherein each of the plurality of inverter circuits is connected to a respective fuel cell supplying a direct current (DC) signal via a respective DC bus, wherein each respective fuel cell and DC bus of the plurality of inverter circuits is isolated on respective input sides of the plurality of inverter circuits from the respective fuel cells and DC buses of other inverter circuits of the plurality of inverter circuits;

a controller configured to generate timing signals for the plurality of inverter circuits to generate the respective AC phase signals for the output based on signals received from the respective fuel cells;

a plurality of synchronous rectifier circuits configured to each supply respective DC signals to respective ones of the plurality of inverter circuits; and an alternator configured to provide AC power to the plurality of synchronous rectifier circuits via respective alternator windings;

wherein the plurality of synchronous rectifier circuits are configured to operate in reverse to drive the respective alternator windings to transfer power to at least one of the respective DC buses.

* * * * *